(12) United States Patent
De et al.

(10) Patent No.: US 9,600,344 B2
(45) Date of Patent: Mar. 21, 2017

(54) PROPORTIONAL RESIZING OF A LOGICAL PARTITION BASED ON A DEGREE OF PERFORMANCE DIFFERENCE BETWEEN THREADS FOR HIGH-PERFORMANCE COMPUTING ON NON-DEDICATED CLUSTERS

(75) Inventors: Pradipta De, Kolkata (IN); Ravi Kothari, New Delhi (IN); Vijay Mann, Haryana (IN); Rajiv Sachdev, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1789 days.

(21) Appl. No.: 12/356,606

(22) Filed: Jan. 21, 2009

(65) Prior Publication Data
US 2010/0185823 A1 Jul. 22, 2010

(51) Int. Cl.
G06F 9/50 (2006.01)
G06F 9/52 (2006.01)

(52) U.S. Cl.
CPC .............. G06F 9/5077 (2013.01); G06F 9/52 (2013.01)

(58) Field of Classification Search
CPC .................................................... G06F 9/5077
See application file for complete search history.

(56) References Cited

U.S. PATENT DOCUMENTS

| 7,665,000 | B2* | 2/2010 | Gonzalez et al. | 714/724 |
| 7,665,090 | B1* | 2/2010 | Tormasov et al. | 718/104 |
| 7,792,819 | B2* | 9/2010 | Barsness et al. | 707/713 |
| 7,844,709 | B2* | 11/2010 | Aman et al. | 709/226 |
| 8,146,091 | B2* | 3/2012 | Johnson et al. | 718/104 |
| 2004/0088708 | A1* | 5/2004 | Ramanujam et al. | 718/107 |
| 2007/0124274 | A1* | 5/2007 | Barsness et al. | 707/2 |
| 2007/0157206 | A1* | 7/2007 | Rakvic et al. | 718/102 |
| 2008/0071755 | A1* | 3/2008 | Barsness et al. | 707/4 |
| 2009/0150640 | A1* | 6/2009 | Royer et al. | 711/173 |

OTHER PUBLICATIONS

Mergen, et al., "Virtualization for High Performance Computing", in ACM SIGOPS Operating Systems Review, pp. 8-11, 2006.
Lastovetsky, A. "Adaptive parallel computing on heterogeneous networks with mpC", Parallel Computing 28 (2002) 1369-1407.
Bhandarkar, et al., "Adaptive load balancing for MPI programs", In International Conference on Computational Science, pp. 108-117, San Francisco, CA, May 2001.
Feitelson, et al., "Distributed Hierarchical Control for Parallel Processing", Computer 23(5), pp. 65-77, May 1990.

(Continued)

*Primary Examiner* — David J Huisman
(74) *Attorney, Agent, or Firm* — Ryan, Mason & Lewis, LLP

(57) ABSTRACT

Techniques for enabling high-performance computing are provided. The techniques include resizing a logical partition in a non-dedicated compute cluster server to enable high-performance computing, wherein a high performance computing application is executed such that the high performance computing application is configured to complete execution of each of one or more application threads at a similar time as a slowest thread in the cluster, and wherein the non-dedicated compute cluster comprises one or more servers and the logical partition is created by partitioning one or more server resources.

23 Claims, 3 Drawing Sheets

(56) References Cited

OTHER PUBLICATIONS

Feitelson, D.G. "Packing Schemes for Gang Scheduling", Job Scheduling Strategies for Parallel Processing, Lecture Notes in Computer Science, vol. 1162, pp. 89-110, Springer-Verlag, 1996.
Hales et al. IBM Corporation, "Advanced POWER Virtualization on IBM System p5: Introduction and Configuration", available at www.redbooks.ibm.com/redbooks/pdfs/sg247940.pdf May 2008, pp. 1-15.
Resizing partitions with HP-UX Workload Manager, http://h20338.www2.hp.com/hpux11i/downloads/resizing.partitions.with.wlm.pdf 2008, pp. 1-26.
CISNE : A new integral approach for scheduling parallel applications on non-dedicated clusters, J.C. Cunha and P.D. Medeiros (Eds.): Euro-par 2005, LNCS 3648, pp. 220-230, 2005.
Condor® Version 6.6.11 Manual. www.cs.wisc.edu/condor/manual/v6.6/condor-V6_6_11-Manual.pdf Jun. 19, 2006, pp. 1-15.
Goscinski, et al. A study of the concurrent execution of parallel and sequential applications on a non-dedicated cluster, Parallel Computing 34 (2008) 69-91.
Choi et al. "Coscheduling in Clusters: Is it a Viable Alternative?" http://www-csag.ucsd.edu/teaching/cse294/072505%20Coscheduling%20in%20Clusters.ppt. downloaded Apr. 24, 2009, pp. 1-14. Publication date unknown.
IBM Enterprise Workload Manager, http://publib.boulder.ibm.com/infocenter/eserver/v1r2/index.jsp?topic=/ewlminfo/eicaakickoff.htm downloaded Mar. 3, 2009, pp. 1-3. Publication date unknown.
Ali et al. "Predicting the Resource Requirements of a Job Submission," Caltech Technical Report, Publication Date: Nov. 16, 2004.
HP-UX Workload Manager, Cached URL: http://web.archive.org/web/20090201109198/http://h20338.www2.hp.com/hpux11:/cache/328328-0-0-0-121.html?, Version Released: Sep. 2008.
CheKim Chhour, "Partition Management with EWLM, Part 1: The Basic Rules." Cached URL: http://web.archive.org/web/20070227201048/http://www-128.ibm.com/developerworks/autonomic/library/ac-ew/m-Ipar1/, Publication Date: Jul. 25, 2006, pp. 1-12.
CheKim Chhour, "Partition Management with EWLM, Part 2: Partition Management in Action," Cached URL: http:web.archive.org/web/20080611103124/http://www.ibm.com/developerworks/power/library/ac-ewlm-Ipar2/index.html, Publication Date: Jul. 18, 2006, pp. 1-10.

\* cited by examiner

PROPORTIONAL RESIZING OF A LOGICAL PARTITION BASED ON A DEGREE OF PERFORMANCE DIFFERENCE BETWEEN THREADS FOR HIGH-PERFORMANCE COMPUTING ON NON-DEDICATED CLUSTERS

FIELD OF THE INVENTION

Embodiments of the invention generally relate to information technology, and, more particularly, to high-performance computing (HPC) applications.

BACKGROUND OF THE INVENTION

High-performance computing (HPC) applications are typically run on a dedicated cluster. Significant delays can occur while waiting for the cluster to be available for exclusive use, and long wait times can be experienced by other applications waiting for an HPC application to finish. Also, HPC applications often require periodic synchronization and exhibit performance imbalance among its various threads running on different nodes due to non-uniform hardware, inherent workload and/or computation characteristics, changes in resources available to them because of other competing applications, etc.

Running HPC applications on a non-dedicated cluster commonly impacts the non-HPC workload. Hence, the compute resources allocated to HPC applications across nodes should be optimized in such a way that there is no wastage. However, it is observed that nodes running slower HPC threads hold up the synchronization step even if other (faster) nodes have finished computation. This performance imbalance results in wastage of compute resources. Also, another challenge with running HPC applications on non-dedicated clusters is that the compute resources available to HPC threads vary over time as non-HPC workload executes.

Existing approaches attempting to run HPC applications on non-dedicated clusters include balancing performance of HPC threads that suffer from performance imbalance caused either by the presence of other competing threads from non-HPC applications that cause changes in resources available to HPC threads or because of inherent workload imbalance amongst the different HPC threads. However, such approaches ignore the impact on competing non-HPC workload.

SUMMARY OF THE INVENTION

Principles and embodiments of the invention provide techniques for enabling high-performance computing on non-dedicated clusters.

An exemplary method (which may be computer-implemented) for enabling high-performance computing, according to one aspect of the invention, can include resizing a logical partition in a non-dedicated compute cluster server to enable high-performance computing, wherein a high performance computing application is executed such that the high performance computing application is configured to complete execution of each of one or more application threads at a similar time as a slowest thread in the cluster, and wherein the non-dedicated compute cluster comprises one or more servers and the logical partition is created by partitioning one or more server resources.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
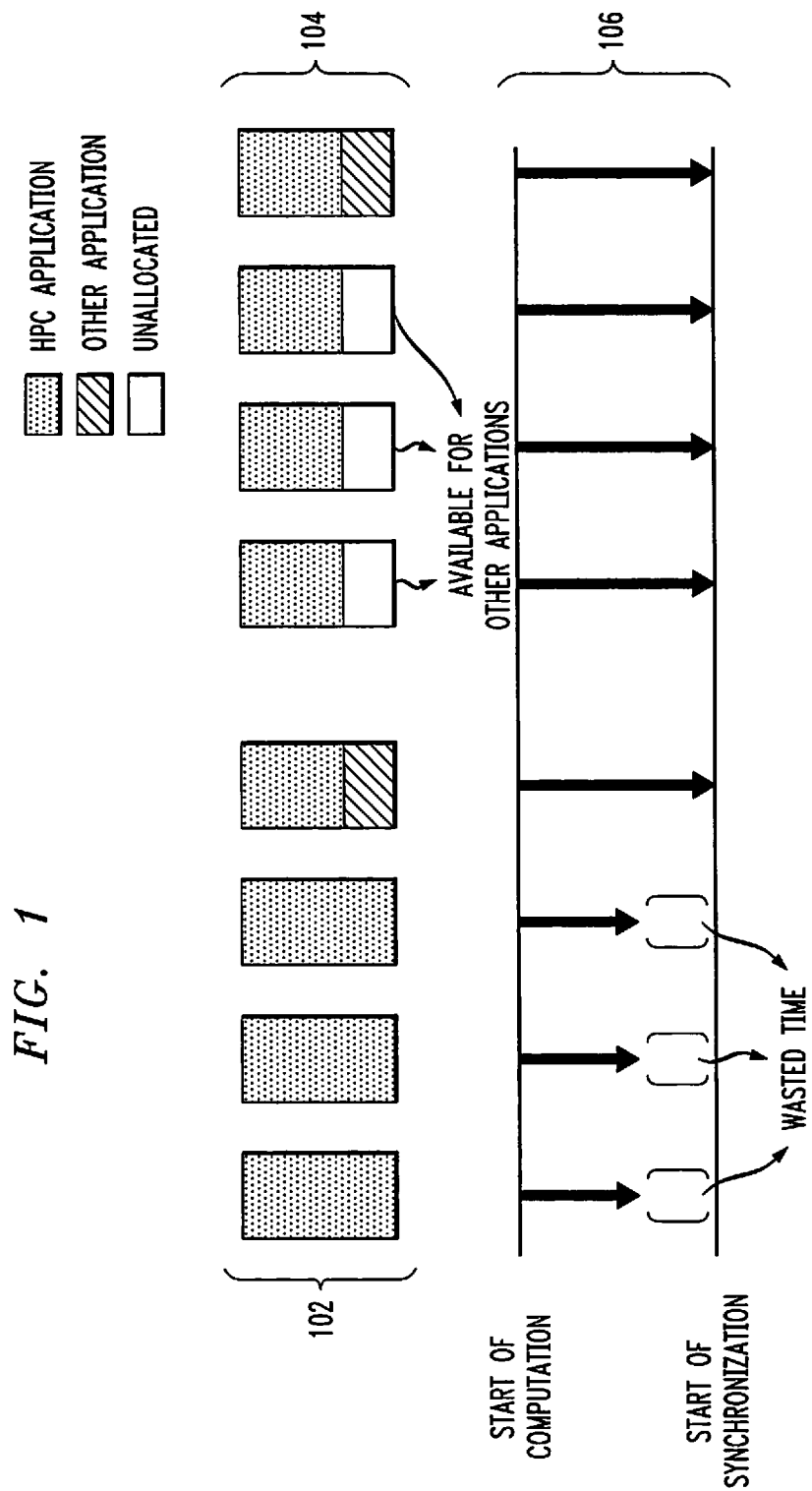
FIG. 1 is a diagram illustrating resizing of a homogeneous cluster, running a high-performance computing (HPC) application on all nodes and a non-high-performance computing application on one node, to free up unutilized computing resources, according to an embodiment of the present invention.

Principles of the invention include enabling high-performance computing (HPC) applications on non-dedicated clusters by exploiting virtualization and parallel application performance imbalance. One or more embodiments of the invention include partitioning one or more server resources to create separate logical partitions (or virtual machines) for a high-performance computing cluster workload and a non-high-performance computing cluster workload respectively, ensuring that logical partitions across different servers that run threads belonging to the same high performance computing workload are scheduled at the same time.

Also, one or more embodiments of the invention include determining unutilized compute resources in one or more partitions running high-performance computing cluster workload across each server of the one or more non-dedicated clusters through monitoring of performance imbalance among high performance computing application threads, and resizing one or more logical partitions running high-performance computing cluster workload, wherein resizing comprises allocating the unutilized compute resources to current or future non-high-performance computing cluster workload.

As described herein, HPC applications can have multiple threads with computation followed by synchronization calls. If any one thread takes longer in computation, the other threads are stalled at the synchronization call, and compute cycles are wasted. In a non-homogeneous cluster, where the nodes have different ratings, threads running on faster cores will complete ahead of the other threads, thereby wasting processor cycles.

Unlike the disadvantageous existing approaches noted above, the techniques described herein include executing HPC applications on non-dedicated servers while taking into account the performance imbalance among various HPC application threads and the local non-HPC cluster workload. Also, one or more embodiments of the invention use virtualization as well as monitoring parallel program load imbalance, and can be used to run both HPC and non-HPC workload simultaneously as a result of being based on full virtualization of a physical machine rather than virtualization of an application.

Further, in contrast to existing approaches, one or more embodiments of the invention include measuring the performance imbalance in HPC applications through active monitoring, thereby enabling effective use of the cluster resources. Additionally, the techniques described herein also free up excess capacity across logical partitions running HPC cluster workload by monitoring performance imbalance in HPC application threads and reusing it for running a non-HPC enterprise cluster workload.

As noted herein, HPC applications require periodic synchronization and often have performance imbalance across different HPC threads due to inherent workload imbalance, or due to changes in resources availability caused by other competing non-HPC competing threads. This performance imbalance creates excess capacity on nodes where HPC threads are performing faster. As such, one or more embodiments of the invention utilize this excess capacity through the use of virtualization technology by creating a separate logical partition on each node for the HPC application thread and resizing it based on the excess capacity, as compared to the slowest HPC application thread across the cluster, while ensuring that resource requirements of non-HPC workloads are met. Because HPC application threads belonging to the same application synchronize at the end of each compute phase, one should ensure that logical partitions across different servers that run threads belonging to the same high performance computing workload are scheduled at the same time. This requires implementation of a gang-scheduling or co-scheduling technique at the hypervisor (or virtual machine monitor (VMM)) layer.

Additionally, one or more embodiments of the invention include using commercial clusters for running high performance parallel applications related to scientific computations, and to use processor virtualization to create dedicated partitions for the HPC applications and resize them based on HPC application performance imbalance. Such techniques help in utilizing the excess processor cycles on nodes that run the faster HPC application threads, for running the non-HPC workload.

Large clusters are often underutilized because the workload on each server node constituting the cluster is not enough to consume the compute resources completely. One or more embodiments of the invention harness this unutilized compute resources across servers, and utilize them for running high performance parallel applications while ensuring that the service level agreement (SLA) requirements of non-HPC applications are met. Separate logical partitions (or virtual machines) for a high-performance computing cluster workload and a non-high-performance computing cluster workload can be created and the threads of the HPC application can be spawned on each of these partitions on the server nodes in the cluster.

In one or more embodiments of the invention, one can assume virtualization is available on each node and the HPC application is scheduled on a dedicated logical partition (LPAR) on each node, as well as there being another LPAR on each node for other non-HPC applications. As described herein, one or more embodiments of the invention include enabling the simultaneous use of a cluster for running HPC applications. By way of example, one can create identical virtual partitions on each node of the cluster, leaving one partition for executing HPC application, and the other for running the non-HPC workload. If there are non-HPC jobs waiting, for example, at a workload manager (WLM) job queue, then the non-HPC partition can be created to ensure SLA guarantees for the non-HPC workload.

Also, one or more embodiments of the invention periodically obtain an estimate of how long it would take for the slowest HPC thread to finish the present compute phase. This time when compared to the time taken by HPC threads on other nodes provides measure of the performance imbalance among the HPC threads. Additionally, one can reduce the size of the LPARs running the faster HPC application threads to finish at the same time as the slowest HPC thread, thereby releasing compute resources for additional non-HPC applications to be scheduled on these nodes. If the non-HPC application (previously running) has terminated and there are no more non-HPC applications waiting to be scheduled, for example, in the workload manager queue, one can also increase the size of the LPARs running the HPC application threads, thereby allocating them more resources. Further, one can incorporate node heterogeneity in the computation of resizing the LPAR. The above-noted techniques can be repeated periodically, thereby accommodating dynamic cluster workload.

As described herein, clusters can be homogenous, wherein all the nodes are identical settings in terms of compute power, memory resources, etc, or clusters can be heterogeneous, wherein the nodes can have different hardware settings (for example, the processor ratings could be different). As such, one or more embodiments of the invention include configuring a cluster to allow concurrent execution of HPC workload simultaneously with the non-HPC cluster workloads.

FIG. 1 is a diagram illustrating resizing of a homogeneous cluster, running a high-performance computing (HPC) application on all nodes and a non-high-performance computing application on one node, to free up unutilized computing resources, according to an embodiment of the present invention. By way of illustration, FIG. 1 depicts the process of enabling an HPC application in presence of a non-HPC workload in a homogeneous cluster, creation of a non-HPC workload partition on one of the nodes (component 102), resizing of the HPC workload partitions across all nodes such that all HPC threads finish at the same time (component 104), and freeing up of unutilized compute resources on nodes running faster HPC application threads (component 106).

FIG. 1 depicts a homogeneous cluster. Initially, if there is no other workload to be run, the HPC application can use the entire cluster. When a non-HPC workload (shown as the striped partitions in component 102) needs to executed, it is spawned in a virtual partition that is created on one of the nodes. The size of this partition is determined based on the historical resource requirements of the non-HPC workload so that it meets its performance objectives (or service level agreements (SLAs)). The performance of the HPC threads continues to be monitored periodically.

If it is found that the HPC thread running in the reduced size partition is performing the slowest and is holding up all of the other HPC threads (which is likely to happen if the HPC application has no inherent workload imbalance among its threads), then the HPC partition on all nodes running faster HPC threads is reduced in size in the same proportion. This creates excess capacity on all of those nodes (shown in component 104 as the clear/white partitions). Subsequent workloads can be spawned on the available partitions, also shown as the clear/white partitions in component 106. If all of the available partitions are used up by the workloads, then the HPC partition will be shrunk further on all nodes in order to accommodate the cluster workloads.

Figure 2:
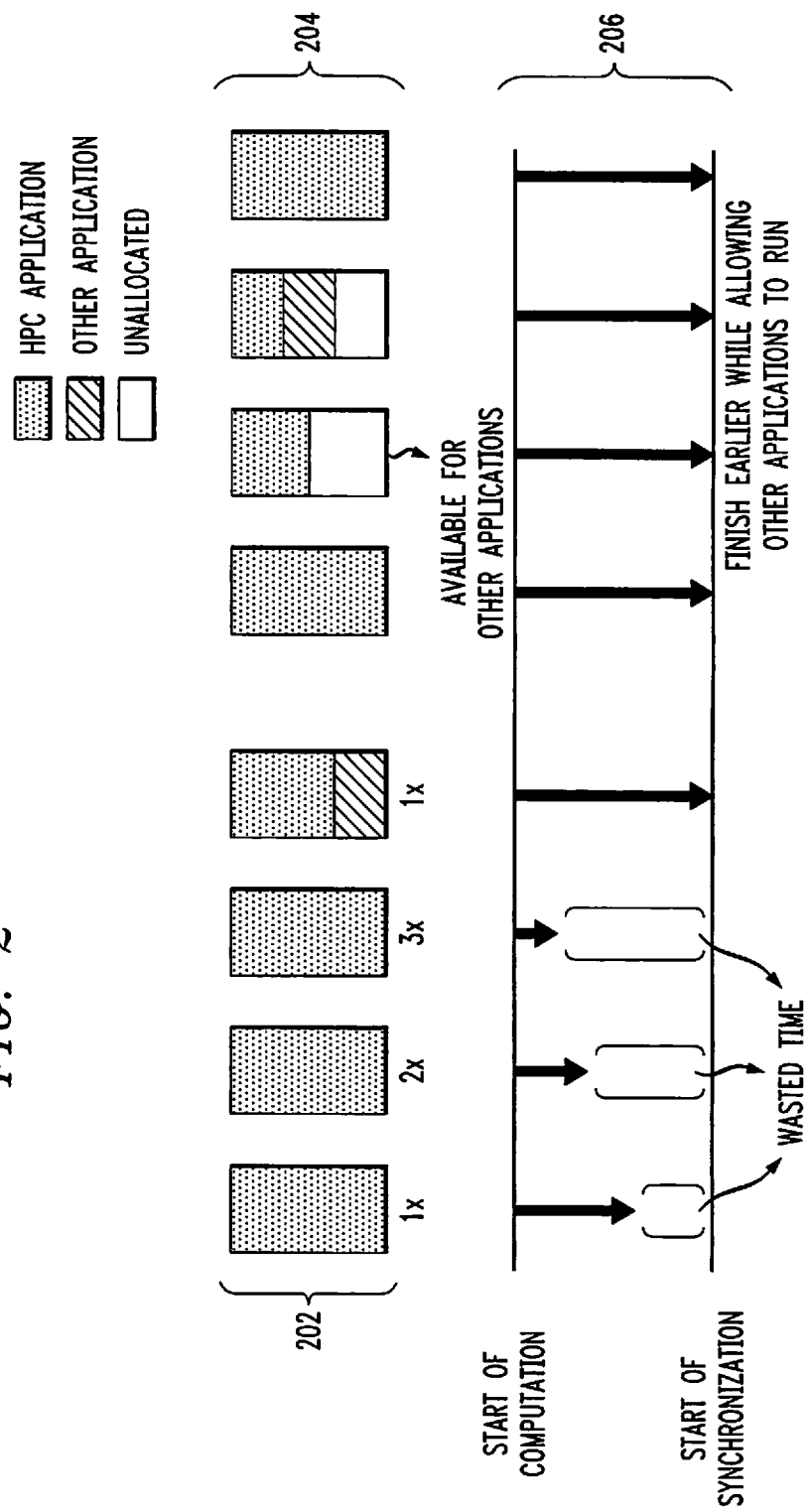
FIG. 2 is a diagram illustrating resizing of a non-homogeneous cluster, running a high-performance computing (HPC) application on all nodes and a non-high-performance computing application on one node, to free up unutilized computing resources, according to an embodiment of the present invention.

FIG. 2 is a diagram illustrating resizing of a non-homogeneous cluster, running a high-performance computing (HPC) application on all nodes and a non-high-performance computing application on one node, to free up unutilized computing resources, according to an embodiment of the present invention. By way of illustration, FIG. 2 depicts the process of enabling an HPC application in presence of a non-HPC workload in a heterogeneous cluster, creation of a non-HPC workload partition on one of the nodes (component 202), resizing of the HPC workload partitions across all nodes such that all HPC threads finish at the same time (component 204), and freeing up of unutilized compute resources on nodes running faster HPC application threads (component 206).

FIG. 2 depicts a heterogeneous cluster where the central processing unit (CPU) ratings are different on some of the nodes. In component 202, values 1×, 2×, 3× denote CPU ratings. The rating implies that given the same workload to run on the nodes, the time taken to complete will be inversely proportionate to the ratings. This will lead to larger amount of spare cycles at the node with the higher rating, as shown in component 206. The same strategy as explained for the homogeneous case in FIG. 1 can be applied to allocate resources to a partition. One difference with the homogenous case is that, since the CPU ratings are different, and therefore the HPC partitions are allocated equal compute resources so that the threads complete at the same time and there is no delay at the synchronization call.

As described herein, one or more embodiments of the invention include a formulation to figure out what proportion of the compute resources on each server can be allocated to a LPAR that runs the HPC thread. For example, one or more embodiments of the invention use the following. Let $C_i$ be the processor rating of the server. Let $H_i(t)$ be the compute resources used for the HPC LPAR. As such, the LPAR running the cluster applications has $(C_i - H_i(t))$ available compute resources. Given that $T_i(t)$ is an estimate for the HPC application to complete its present compute phase, $H_i(t)$ will be a function of $T_i(t)$ and $C_i$ on each server node. As a result, across all nodes, $$H_i(t) = f(\max_i(T_i(t)), C_i)$$

Also, by way of example, the formulation can be simplified with the following additional step prior to starting any application. The step maps the non-homogeneous case to the homogeneous case. A workload manager can partition the nodes with faster processors into two partitions: an HPC partition matching the node with the slowest processor, and another LPAR having the remaining compute resources. Initially, the workload manager can attempt to fit the submitted cluster applications into the available free partitions. Once the available partitions are all used up and there is a need to shrink the HPC partition to provide additional compute resources to the cluster applications, then one of the node's HPC partition is resized. All other HPC partitions can be resized to the same size, thereby creating free compute resources on all other server nodes.

Based on the simplification, the general formula for a node to compute its HPC partition size in terms of percentage reduction of current allocation can be as follows:

$$[\max_i(T_i * C_i) - (T_i * C_i)]/(T_i * C_i) * 100,$$

where, $T_i$ is the time taken to complete a phase on a LPAR with capacity $C_i$.

Monitoring the cycles consumed by a HPC thread and adjusting the HPC partitions to the size of the slowest HPC thread provides an additional benefit of eliminating wasted cycles at the synchronization call for load imbalanced HPC applications. If there is load imbalance, the thread with the highest chunk of work will be the slowest and the other threads will finish faster. After monitoring, it is possible to allocate greater resources to the slowest thread if there is no non-HPC cluster workload to be scheduled.

When it is required to run multiple HPC applications along with multiple non-HPC cluster applications, the number of LPARs to be created can be stated as the following: the number of HPC applications+1. The same strategy as described above can be adopted to create LPARs for the HPC applications, and it is ensured that the non-HPC cluster applications are not affected.

A workload manager (WLM), responsible for submitting jobs to the different nodes, can take care of allocating jobs intelligently to each node, ensuring that the SLAs for non-HPC jobs are not violated. The decision can be based on the historical resource requirements of the non-HPC workload to meet its SLA. Spare resources would be available in different proportions on each node. The WLM can find the best match between a workload's requirement and the resources available on a node, and map jobs from its workload queue onto the respective cluster nodes.

As described herein, the structure of a typical HPC application can include repeated [compute on each node, synchronization amongst nodes] phases. Due to the synchronization phase, a slow node can slow down the HPC application. In a non-exclusive mode, when an application is scheduled, it slows the node down. Other nodes may continue to work without a slow-down, but they have to wait until the slow node finishes. As noted herein, the resources on the other (faster) nodes could be more efficiently used (for example, by controlled scheduling of other applications).

With the techniques described herein, two partitions are created, one for HPC apps, and one to run non-HPC cluster workload. A WLM can find the best fit between a job in the workload queue and the workload partition on a node. Also, compute cycles used by HPC thread are recorded, thereby helping in adjusting the HPC partition size.

Figure 3:
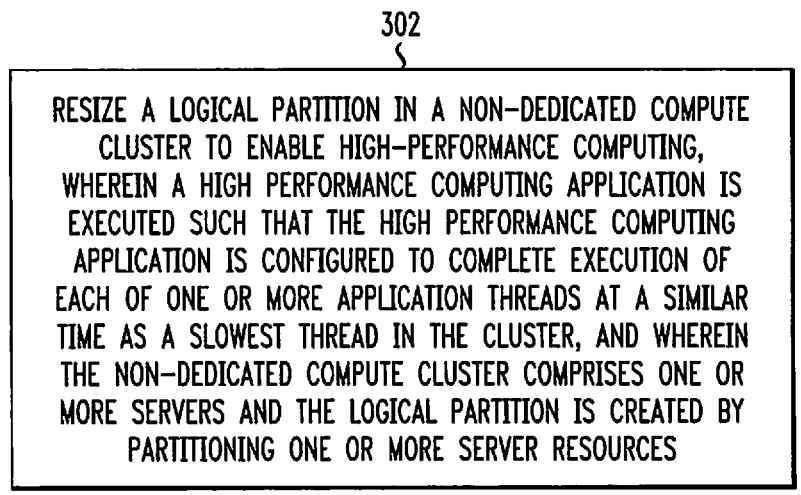
FIG. 3 is a flow diagram illustrating techniques for enabling high-performance computing, according to an embodiment of the present invention.

FIG. 3 is a flow diagram illustrating techniques for enabling high-performance computing (for example, on non-dedicated clusters), according to an embodiment of the present invention. Step 302 includes resizing a logical partition in a non-dedicated compute cluster to enable high-performance computing, wherein a high performance computing application is executed such that the high performance computing application is configured to complete execution of each of one or more application threads at a similar instance as a slowest thread in the cluster, and wherein the non-dedicated compute cluster comprises one or more servers and the logical partition is created by partitioning one or more server resources.

A logical partition can include a separate logical partition for each one of the high-performance computing cluster workloads and a logical partition for the non-high-performance computing cluster workload. Partitioning resources can include using historical resource usage data of the non-high-performance computing cluster workload to predict resource requirements of a non-high-performance computing cluster workload such that service level agreement (SLA) requirements of the non-high-performance computing cluster workload are guaranteed.

Configuring the high performance computing application to complete execution of each application thread at a similar time as a slowest thread in the cluster can include determining unutilized compute resources in the logical partition in the high performance computing cluster server (or, for example, across each server of one or more non-dedicated clusters) via monitoring performance imbalance among each of the high performance computing application threads.

Also, monitoring performance imbalance among each of the high performance computing application thread includes monitoring excess capacity at each of one or more nodes. Further, monitoring excess capacity can include measuring cycles used by each high-performance computing application thread on each node in a given time window, and calculating the cycles that are in excess at each node with respect to a slowest high-performance computing application thread.

Resizing the logical partition in a non-dedicated compute cluster server can include, for example, allocating unutilized compute resources to non-high-performance computing cluster workloads (for example, current and/or future non-HPC cluster workloads). Additionally, resizing the logical partition can include resizing compute resources at each physical node, as well as dynamically resizing the logical partition in proportion of an excess capacity. Further, resizing of the partitions that run the faster HPC application threads allows the non-HPC applications to better utilize the excess compute resources. Also, resizing the logical partition can include taking into account resource requirements of a non-high-performance computing workload (for example, the non-HPC workload in the workload manager request queue) such that service level agreement (SLA) requirements of the non-high-performance computing workload are guaranteed.

The techniques depicted in FIG. 3 can also include ensuring that logical partitions across different servers that run one or more threads belonging to a same high-performance computing workload are scheduled concurrently. Additionally, one or more embodiments of the invention include implementing a gang-scheduling (or co-scheduling) scheme at a hypervisor (or virtual machine monitor (VMM)) layer such that logical partitions across different servers that run one or more threads belonging to a same high performance computing workload are scheduled concurrently.

Further, the techniques depicted in FIG. 3 can also include creating a separate high-performance computing partition for each high-performance computing application, as well as running one high-performance computing application in a single logical partition to ensure synchronization across one or more threads without interference.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 4:
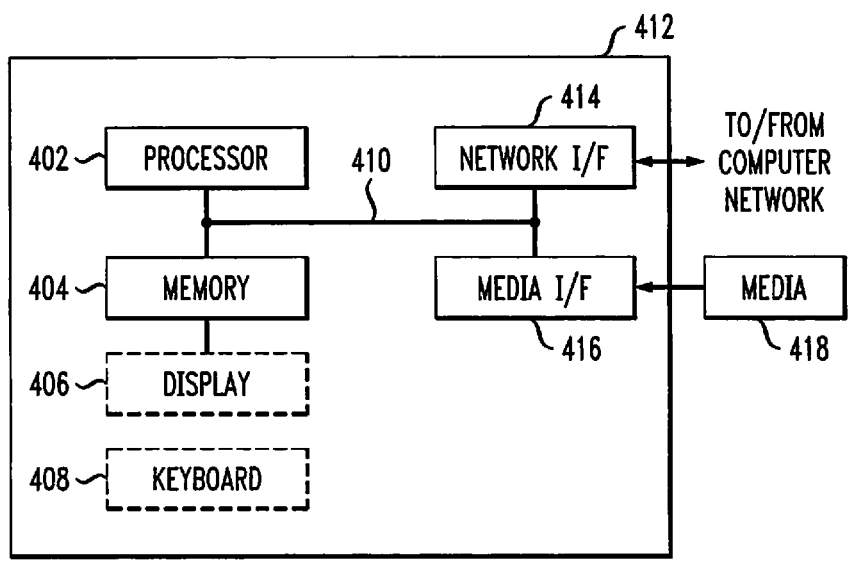
FIG. 4 is a system diagram of an exemplary computer system on which at least one embodiment of the present invention can be implemented.

At present, it is believed that the preferred implementation will make substantial use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 404), magnetic tape, a removable computer diskette (for example, media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, executing HPC on non-dedicated servers while taking into account the local load and corresponding performance.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enabling high-performance computing, the method comprising:
    resizing one or more logical partitions in a non-dedicated compute cluster to enable high-performance computing, wherein a high-performance computing application is executed such that the high-performance computing application is configured to execute each of multiple high-performance computing application threads on a corresponding individual logical partition on a separate corresponding server, and to reduce differences in execution completion time for each of the multiple high-performance computing application threads, and wherein the non-dedicated compute cluster comprises multiple servers and a logical partition is created by partitioning one or more server resources;
    wherein resizing the one or more logical partitions comprises:
        determining a difference in performance of each of said high-performance computing application threads of the high-performance computing application in the non-dedicated compute cluster with respect to the slowest thread of the high-performance computing application; and
        resizing a current allocation of capacity of each logical partition in which a corresponding high-performance computing application thread has a difference in performance with respect to the slowest thread of the high-performance computing application via a percentage reduction of the current allocation of capacity, wherein said percentage reduction of the current allocation of capacity is:
            computed for the logical partition with the highest product of (i) time taken to complete a phase and (ii) capacity in proportion to the associated difference in performance in terms of a percentage computed via $[\max_i(T_i*C_i)-(T_i*C_i)]/(T_i*C_i)*100$, wherein, $T_i$ is the time taken to complete a phase on a given logical partition with capacity $C_i$; and
            set for the remaining logical partitions, excluding the logical partition associated with the slowest thread of the high-performance computing application, in the same proportion as computed for the logical partition with the highest product of (i) time taken to complete a phase and (ii) capacity.

2. The method of claim 1, wherein logical partition creation comprises creating one or more separate logical partitions for each one of one or more high-performance computing cluster workloads and for a non-high-performance computing cluster workload.

3. The method of claim 1, comprising determining unutilized compute resources in a logical partition in a high-performance computing cluster via monitoring performance imbalance among each of one or more high-performance computing application threads.

4. The method of claim 3, wherein monitoring performance imbalance among each of the one or more high-performance computing application threads comprises monitoring excess capacity at each of one or more nodes.

5. The method of claim 4, wherein monitoring excess capacity comprises:
    measuring one or more cycles used by each high-performance computing application thread on each node in a given time window; and
    identifying the one or more cycles that are in excess at each node with respect to a slowest high-performance computing application thread.

6. The method of claim 1, wherein resizing the one or more logical partitions in the non-dedicated compute cluster comprises allocating unutilized compute resources to one or more non-high-performance computing cluster workloads.

7. The method of claim 1, further comprising ensuring that one or more logical partitions across one or more different servers that run one or more threads belonging to a same high-performance computing workload are scheduled concurrently.

8. The method of claim 1, wherein partitioning one or more server resources comprises using historical resource usage data of a non-high-performance computing cluster workload to predict one or more resource requirements of the non-high-performance computing cluster workload such that one or more service level agreement (SLA) requirements of the non-high-performance computing cluster workload are guaranteed.

9. The method of claim 1, further comprising implementing a gang-scheduling scheme at a hypervisor layer such that one or more logical partitions across different servers that run one or more threads belonging to a same high-performance computing workload are scheduled concurrently.

10. The method of claim 1, wherein resizing the one or more logical partitions comprises resizing compute resources at each of one or more physical nodes.

11. The method of claim 1, wherein resizing the one or more logical partitions comprises dynamically resizing the one or more logical partitions in proportion of an excess capacity.

12. The method of claim 1, further comprising creating a separate high-performance computing partition for each high-performance computing application.

13. The method of claim 1, wherein resizing the one or more logical partitions comprises taking into account one or more resource requirements of a non-high-performance computing workload such that one or more service level agreement (SLA) requirements of a non-high-performance computing workload are guaranteed.

14. A computer program product comprising a tangible non-transitory computer readable storage medium having computer readable program code for enabling high-performance computing, said computer program product including:
  computer readable program code for resizing one or more logical partitions in a non-dedicated compute cluster to enable high-performance computing, wherein a high-performance computing application is executed such that the high-performance computing application is configured to execute each of multiple high-performance computing application threads on a corresponding individual logical partition on a separate corresponding server, and to reduce differences in execution completion time for each of the multiple high-performance computing application threads, and wherein the non-dedicated compute cluster comprises multiple servers and a logical partition is created by partitioning one or more server resources;
  wherein resizing the one or more logical partitions comprises:
    determining a difference in performance of each of said high-performance computing application threads of the high-performance computing application in the non-dedicated compute cluster with respect to the slowest thread of the high-performance computing application; and
    resizing a current allocation of capacity of each logical partition in which a corresponding high-performance computing application thread has a difference in performance with respect to the slowest thread of the high-performance computing application via a percentage reduction of the current allocation of capacity, wherein said percentage reduction of the current allocation of capacity is:
      computed for the logical partition with the highest product of (i) time taken to complete a phase and (ii) capacity in proportion to the associated difference in performance in terms of a percentage computed via $[\max_i(T_i*C_i)-(T_i*C_i)]/(T_i*C_i)*100$, wherein, $T_i$ is the time taken to complete a phase on a given logical partition with capacity $C_i$; and
      set for the remaining logical partitions, excluding the logical partition associated with the slowest thread of the high-performance computing application, in the same proportion as computed for the logical partition with the highest product of (i) time taken to complete a phase and (ii) capacity.

15. The computer program product of claim 14, comprising computer readable program code for creating one or more separate logical partitions for each one of one or more high-performance computing cluster workloads and for a non-high-performance computing cluster workload.

16. The computer program product of claim 14, comprising computer readable program code for determining unutilized compute resources in a logical partition in a high-performance computing cluster via monitoring performance imbalance among each of one or more high-performance computing application threads.

17. The computer program product of claim 16, wherein the computer readable program code for monitoring performance imbalance among each of the one or more high-performance computing application threads comprises computer readable program code for monitoring excess capacity at each of one or more nodes.

18. The computer program product of claim 14, wherein the computer readable program code for resizing the one or more logical partitions in the non-dedicated compute cluster comprises computer readable program code for allocating unutilized compute resources to one or more non-high-performance computing cluster workloads.

19. A system for enabling high-performance computing, the system comprising:
  a memory; and
  at least one processor coupled to said memory and operative to:
    resize one or more logical partitions in a non-dedicated compute cluster to enable high-performance computing, wherein a high-performance computing application is executed such that the high-performance computing application is configured to execute each of multiple high-performance computing application threads on a corresponding individual logical partition on a separate corresponding server, and to reduce differences in execution completion time for each of the multiple high-performance computing application threads, and wherein the non-dedicated compute cluster comprises multiple servers and a logical partition is created by partitioning one or more server resources;
  wherein resizing the one or more logical partitions comprises:
    determining a difference in performance of each of said high-performance computing application threads of the high-performance computing application in the non-dedicated compute cluster with respect to the slowest thread of the high-performance computing application; and
    resizing a current allocation of capacity of each logical partition in which a corresponding high-performance computing application thread has a difference in performance with respect to the slowest thread of the high-performance computing application via a percentage reduction of the current allocation of capacity, wherein said percentage reduction of the current allocation of capacity is:
      computed for the logical partition with the highest product of (i) time taken to complete a phase and (ii) capacity in proportion to the associated difference in performance in terms of a percentage computed via $[\max_i(T_i*C_i)-(T_i*C_i)]/(T_i*C_i)*100$, wherein, $T_i$ is the time taken to complete a phase on a given logical partition with capacity $C_i$; and
      set for the remaining logical partitions, excluding the logical partition associated with the slowest thread of the high-performance computing application, in the same proportion as computed for the logical partition with the highest product of (i) time taken to complete a phase and (ii) capacity.

20. The system of claim 19, wherein, in logical partition creation, the at least one processor coupled to said memory is further operative to create one or more separate logical partitions for each one of one or more high-performance computing cluster workloads and for a non-high-performance computing cluster workload.

21. The system of claim 19, wherein, in configuring, the at least one processor coupled to said memory is further operative to determine unutilized compute resources in a logical partition in a high-performance computing cluster via monitoring performance imbalance among each of one or more high-performance computing application threads.

22. The system of claim 21, wherein, in monitoring performance imbalance among each of the one or more high-performance computing application threads, the at least one processor coupled to said memory is further operative to monitor excess capacity at each of one or more nodes.

23. The system of claim 19, wherein, in resizing the one or more logical partitions in the non-dedicated compute cluster, the at least one processor coupled to said memory is further operative to allocate unutilized compute resources to one or more non-high-performance computing cluster workloads.

* * * * *